United States Patent [19]

Colarusso

[11] Patent Number: 4,799,704
[45] Date of Patent: Jan. 24, 1989

[54] THREE-WHEELED CYCLE

[76] Inventor: Peter R. Colarusso, 4779 Lehto La., Lake Worth, Fla. 33463

[21] Appl. No.: 39,106

[22] Filed: Apr. 16, 1987

[51] Int. Cl.[4] ............................................. B62K 5/08
[52] U.S. Cl. .................................... 280/267; 280/282
[58] Field of Search ................. 280/282, 281 LP, 268, 280/269, 267

[56] References Cited

U.S. PATENT DOCUMENTS

| | | | |
|---|---|---|---|
| 1,540,271 | 6/1925 | Mayer | 280/267 |
| 1,550,133 | 8/1925 | Whitehall | 280/267 |
| 3,447,623 | 6/1969 | Hott | 280/269 X |
| 4,469,344 | 9/1984 | Coil | 280/282 X |
| 4,497,502 | 2/1985 | Forbes et al. | 280/281 LP |

FOREIGN PATENT DOCUMENTS

1078044 11/1954 France ............................. 280/267

Primary Examiner—John A. Pekar
Attorney, Agent, or Firm—Steele, Gould & Fried

[57] ABSTRACT

A three-wheeled cycle includes a frame and first and second wheels, each rotatably mounted to the frame about substantially a horizontal axis and a vertical axis. A drive wheel is rotatably mounted to the frame about a horizontal axis. Pedal structure is provided for driving the drive wheel. Steering structure is provided for rotating the first and second wheels about their vertical axis. Structure can also be provided to automatically adjust the chamber of the first and second wheels into a turn.

16 Claims, 7 Drawing Sheets

THREE-WHEELED CYCLE

BACKGROUND OF THE INVENTION

1. Field of the Invention

This invention relates generally to pedal driven cycles, and more particularly to three-wheeled cycles.

2. Description of the Prior Art

Three-wheeled cycles have several advantages over their two-wheeled counterparts. They do not require a great deal of balance, and therefore are safe for riders of all ages. The stablity of these cycles facilitates sharp turns at relatively high speeds. Three-wheeled cycles are particularly well-suited for frame constructions in which the driver is positioned close to the ground in a recumbent position. This position provides for extra stability and gives the rider an illusion of additional speed for greater excitement.

It is difficult to pedal-drive the front wheel of a three-wheeled cycle and to steer the front wheel as well since the front wheel must be turned sharply at times to properly steer the cycle. The art has taught rear steering three-wheeled cycles where the front wheel is driven by pedalling and the rear wheels are steered by pivoting a single rear axle having a rear wheel journaled to each of its opposite ends. Examples of such rear steering three-wheeled cycles can be found in U.S. Pat. No. 4,580,802; U.S. Pat. No. 4,279,429; and U.S. Pat. No. 4,103,921. Additional steering arrangements taught by the art include those shown in U.S. Pat. No. 4,572,535 and U.S. Pat. No. 3,282,606. Rear steering three-wheeled cycles generally are difficult to steer and are not responsive in their handling.

SUMMARY OF THE INVENTION

It is an object of the invention to provide a three-wheeled cycle with rear steering.

It is another object of the invention to provide a three-wheeled cycle that is easy to steer.

It is still another object of the invention to provide a three-wheeled cycle which has reduced resistance to rolling movement.

It is yet another object of the invention to provide a three-wheeled cycle that is self-centering.

These and other objects are accomplished by a three-wheeled cycle including a frame and first and second wheels rotatably mounted to the frame by wheel mounting structure about substantially a horiziontal axis and a vertical axis. A drive wheel is rotatably mounted to the frame about a horizontal axis. Pedal structure is provided for driving the drive wheel. Steering structure is provided for rotating the first and second wheels about their vertical axis. The horizontal axis of rotation of the first and second wheels preferably trails behind the vertical axis of rotation. This positioning provides a self-centering effect whereby the first and second wheels will automatically return to the straight ahead position when not acted upon by the steering structure. The amount of trail of the horizontal axis of rotation behind the vertical axis of rotation of the first and second wheels is preferably adjustable.

The first and second wheels preferably are each rotatably mounted between legs of a fork. The fork is substantially vertically mounted to the frame and is rotatable with respect to the frame about a vertical axis. Each wheel is preferably mounted to a fork such that the horizontal axis of rotation of the first and second wheels trails behind their respective vertical axes of rotation. The bracket structure can be provided with a plurality of sets of axle mounting structure. Bracket structure is preferably fixed to each of the legs of each fork. Each set of axle mounting structure represents a horizontal axis of rotation that is a different distance behind the vertical axis of rotation that wheel. The axle mounting structure preferably comprises a plurality of holes adapted to receive the axle or similar structure on the respective first or second wheel. Each hole on a bracket is located at a different distance behind the vertical axis of rotation of the fork. Holes are each respective bracket of a fork are matched to provide a rolling axis of rotation that is substantially horizontal and substantially perpendicular to the vertical axis of rotation of the fork.

Steering structure is adapted to rotate at least one of the first and second wheels about its vertical axis. A linkage preferably connects the wheel mounting to handle structure. The handle structure is adapted to move the linkage and thereby act to provide the wheel about its vertical axis of rotation. A connection plate is preferably fixed to the fork and extends a radial distance from the vertical axis of rotation of the fork. The linkage can be fixed to the connecting plate at a radial distance from the vertical axis of rotation of the wheel so as to provide leverage which facilitates steering, since the force transmitted by the linkage acts on the fork through a lever arm defined by the connecting plate. The handle structure is preferably a handle bar pivotally mounted to the frame.

The frame is preferably constructed such that the rider drives the cycle from the recumbent position. The frame preferably is substantially Y-shaped with the legs of the Y being elevated with respect to the base of the Y. The first and second wheels depend respectively from legs of the Y and with the drive wheel mounted at the base of the Y. The seat for the driver is positioned near the juncture of the legs of the Y.

Structure for adjusting the camber of the first and second wheels is preferably provided. The camber adjustment structure preferably comprises means for pivotally mounting the forks or other wheel mounting structure to the frame about a horizontal, longitudinal axis. The pivotal mounting preferably includes two mating disks, one of the disks being fixed to a vertical guide housing through which the fork or other wheel mounting structure is rotatably mounted, and the other disk being fixed to the frame. The fork or other wheel mounting structure can rotate within the vertical guide housing about the vertical axis of the fork. The vertical guide housing, and thus the fork and wheel, can pivot about the horizontal, longitudinal axis defined by the pivotal connection between the mating disks. The mating disks are held by suitable structure such as a bolt which rotatably connects the vertical guide housing to the frame.

A tie rod can be used to connect each of the forks or other wheel mounting structure together. The tie rod is preferably pivotally mounted to the connecting plate of each fork. Rotational movement of a fork and wheel must then be accompanied by similar rotational movement of the opposite fork and wheel. This helps to reduce vibration at high speeds.

The pedal structure can be constructed as is known in the art. The pedals may be fixed directly to the drive wheel. It is preferable, however, to provide a sprocket and chain assembly as is known in the art. It is then possible to provide a number of gears and structure for shifting the chain among the gears. It would alternatively be possible to power the cycle with an electric or internal combustion engine.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENTS

Referring now to FIGS. 1–5, there is shown a three-wheeled cycle according to the invention. The cycle includes a frame 10. First and second wheels 12 and 14, respectively, are rotatably mounted to the frame about substantially a horizontal axis and a vertical axis. A drive wheel 18 is rotatably mounted to the frame about a horizontal axis.

Figure 1:
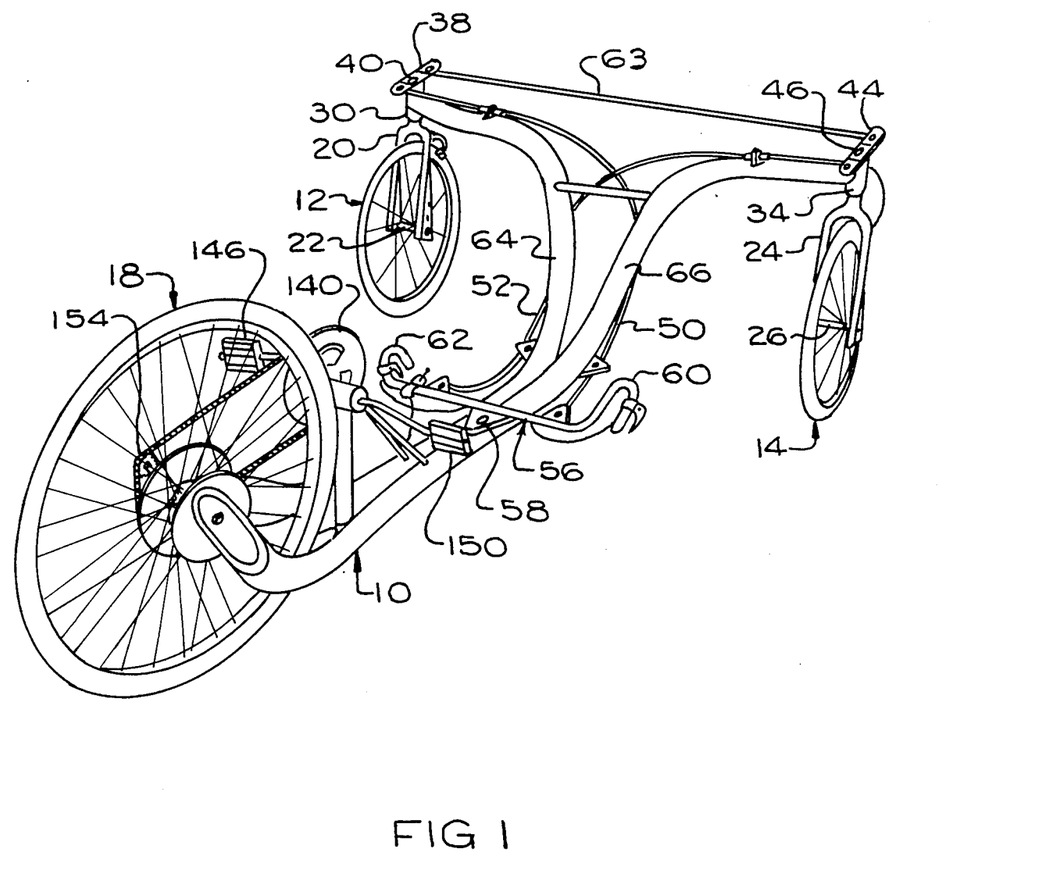
FIG. 1 is a perspective of a three-wheeled cycle according to the invention.
Figure 2:
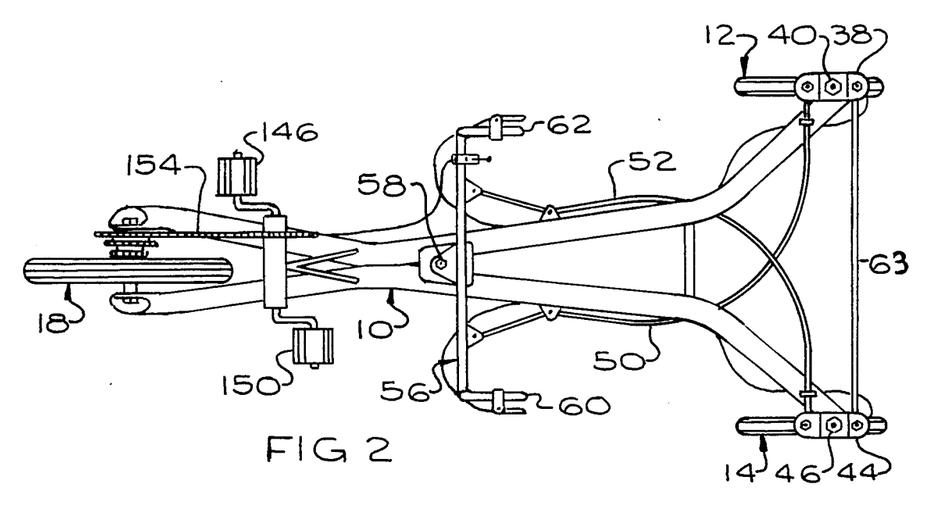
FIG. 2 is a plan view.
Figure 3:
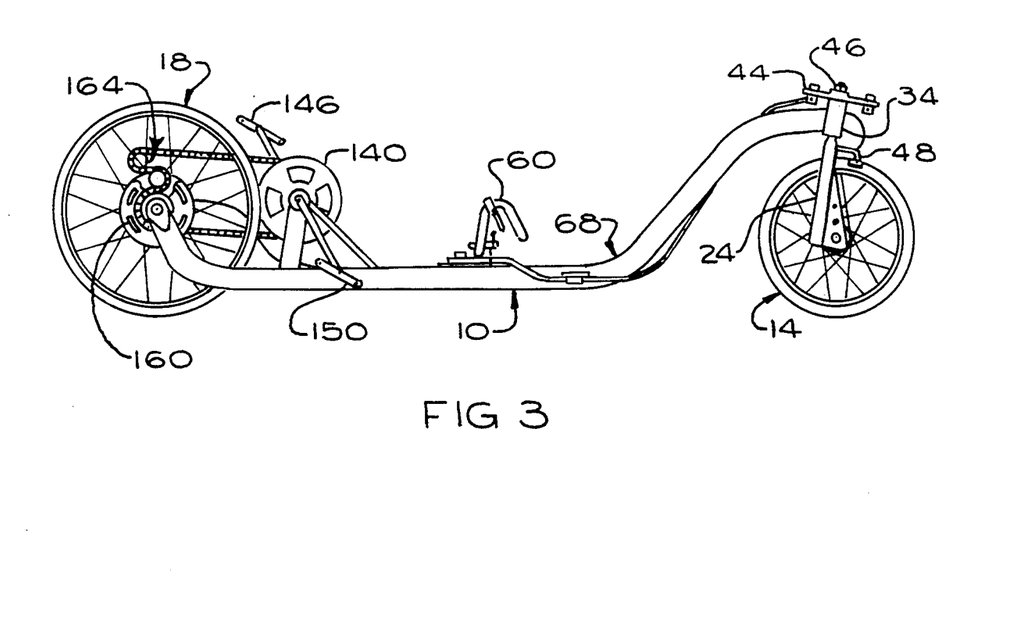
FIG. 3 is a side elevation.

The multi-directional rotation of the first and second wheels 12 and 14 is preferably achieved by mounting these wheels to wheel forks. The first wheel 12 is mounted to a fork 20 which can be substantially in the shape of an inverted Y as shown. The wheel 12 can be mounted to the fork 20 by means known in the art including a wheel axle 22 that is preferably journaled to the fork by bearings. Similarly, the second wheel 14 can be mounted to a fork 24 by journaling an axle 26 with bearing structure. The rotation of the first and second wheels relative to their respective forks is about axes that are substantially horizontal.

The base of each Y-shaped fork is preferably mounted in a vertical guide housing, which can be tubular in construction and is fixed to the frame 10. The base of the fork 20 is rotatably mounted through a vertical guide housing 30. The tubular shape of the vertical guide housing 30 allows the base of the Y-shaped fork 20 to freely rotate within. The fit is snug enough, however, the undue wobble will not be permitted. It is preferable to journaled the fork within the tubular housing 30 as would be apparent to one skilled in the art. Similarly, the fork 24 of the second wheel 14 can be secured in a vertical guide housing 34 fixed to the frame 10.

Figure 4:
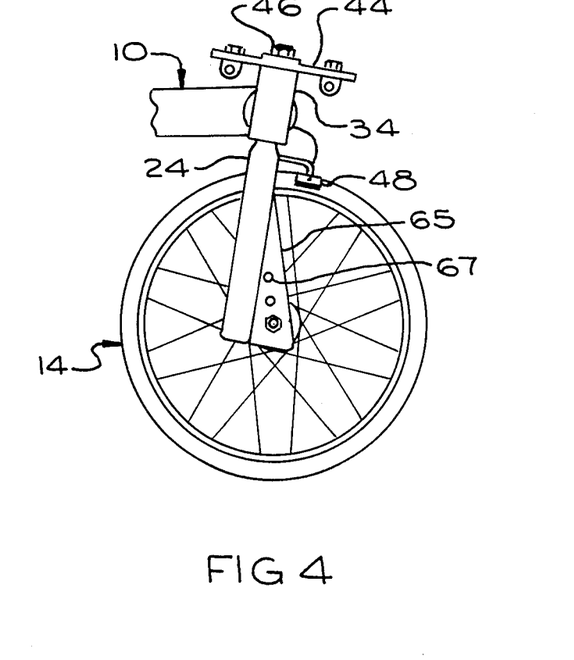
FIG. 4 is an enlarged side elevation of a steerable wheel mounting structure according to the invention.

The fork 20 can be secured within the vertical guide housing 30 by the provision of an expanded portion at the end of the base of the Y-shaped fork 20 opposite the wheel 12. Threaded engagement structure on the fork 20 can be passed through a connecting plate 38 where it can be secured by fastening structure such as the a nut 40 which prevents downward movement of the fork 20 through the vertical guide housing 30. It will be appreciated that the flared legs of the Y-shaped forks prevent vertical movement of the fork 20 through the vertical guide housing. A connecting plate 44 and nut 46 can similarly be used to secure the fork 24 in position. Conventional brake structure 48 can be provided to stop the cycle.

Figure 5:
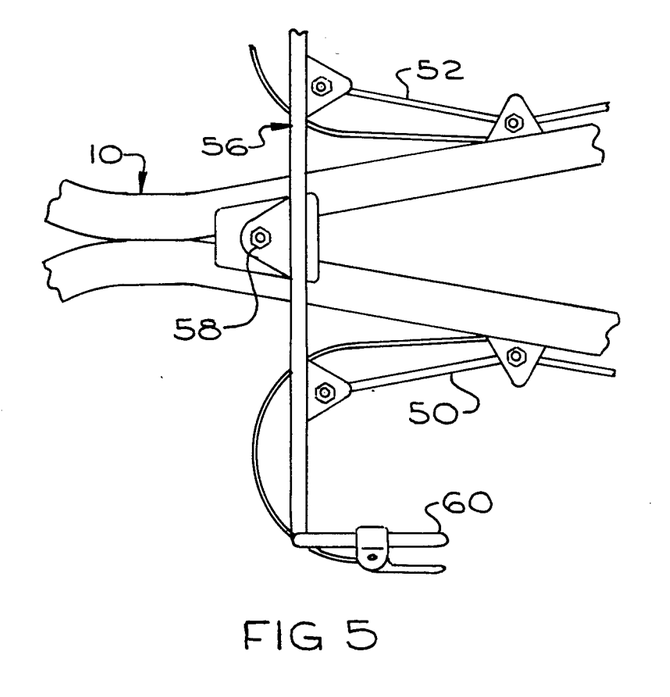
FIG. 5 is an enlarged plan view showing steering structure according to the invention.

Steering structure is adapted to pivot the wheels about their respective vertical axes. The steering structure preferably comprises a linkage from handle structure to the fork or other wheel mounting structure. The handle structure is adapted for manipulation by the driver to move at least one of the linkages and thereby to pivot at least one of the first and second wheels about the respective vertical axle. The linkage is preferably a sheathed cable linkage such as the cable 50 which is operatively connected to the first wheel 12 and the sheathed cable 52 which is operatively connected to the second wheel 14. The linkages are connected such that manipulation by the driver will act to rotate at least one of the first and second wheels. A preferable connection would cause the linkage to pull the first or second wheel about its vertical axis to steer the cycle.

The handle structure preferably is a handle bar 56 that is pivotally mounted to the frame about a pivotal joint 58. The handle bar 56 can be of common design with handles 60 and 62 at opposite ends of the handle bar. The cables 50 and 52 are connected at either side of the pivot joint 58 such that rotation of the handle bar 56 about the pivot joint 58 will move at least one of the linkages 50 or 52. The resulting motion of the cables 50 and 52 will act to pivot the corresponding wheel about its vertical axis.

The linkages 50 and 52 are preferably connected to the connecting plates 38 and 44. The connecting plates 38 and 44 preferably extend outwardly a radial distance from the vertical axis of the forks 20 and 24, respectively. The connection of the linkages 50 and 52 a radial distance outward from the vertical axis of the forks 20 and 24 permits the connecting plates 38 and 44 to act essentially as lever arms to facilitate the pivoting of the first and second wheels 12 and 14. Steering the cycle is thereby far less strenuous than that possible with conventional stub-axle rear wheel cycles.

The first wheel 12 and second wheel 14 are free to pivot independently of one another about both their horizontal and vertical axes. It is also possible to link the rotation of the first wheel 12 and second wheel 14 about their vertical axes together. This can be accomplished by a mechanical linkage such as the tie rod 63. The tie rod 63 is preferably a rigid structural member that is pivotally connected between the connecting plates 38 and 44. The connections between the tie rod 63 and the connecting plates 38 and 44 preferably are on opposite sides of the respective vertical axes of rotation of the forks 20 and 24 from the connections of the linkages 50 and 52. Forces applied by either of the linkages 50 and 52 will rotate the respective connecting plate and wheel about its vertical axis, causing the tie rod 63 to move.

This movement will cause a similar and substantially equal rotational movement of the opposing connecting plate and wheel. The connection helps to prevent vibration of the first and second wheels at high speeds.

The first wheel 12 and the second wheel 14 according to another feature of the invention are mounted to the frame 10 such that their horizontal axes of rotation trail their vertical axes of rotation with respect to the direction of motion of the vehicle. This positioning provides a self-centering effect whereby the first and second wheels will automatically return to the straight ahead position when not acted upon by the steering structure. A plurality of sets of axle mounting structure can be provided on the wheel mounting structure for the respective wheels. Each set of axle mounting structure represents a distance behind the vertical axis of rotation of that wheel that is different from the other axle mounting structure. The first and second wheels can then be attached at these different connecting points on the forks to adjust the amount of trail behind the vertical axis of rotation of the first and second wheels.

Brackets 65 can be mounted to each of the depending legs of each fork. The brackets have a plurality of connection holes 67. The connection holes on opposing brackets of a fork are spatially aligned in sets to position the first and second wheels substantially perpendicular to the ground. Each matched set of connection holes is located a different distance behind the vertical axis of rotation of the respective fork, representing an increased or decreased trail behind the vertical axis of rotation. It is a simple matter to disconnect the first and second wheels from respective sets of connection holes, and to reconnect these wheels in alternative sets of connection holes to increase or decrease the trail behind the vertical axis of rotation of the respective fork.

The frame 10 can be configured in many designs that would be apparent to one skilled in the art. It is preferable, however, to construct the frame 10 in a design by which the driver is held in a recumbent position. This configuration keeps the center of gravity of the cycle close to the ground and thereby increases the overall stability of the cycle. The close proximity of the ground also gives the driver an illusion of speed that lends to the overall excitement of riding the cycle. The frame 10 is preferably configuref in the shape of a Y, with the drive wheel pivotally connected about a horizontal axis to the base of the Y and the first and second wheels depending downwardly from raised legs of the Y. The frame can be conveniently constructed of mirror-image frame elements 64 and 66 that are joined together by fastening means such as welds. The frame elements 64 and 66 are shaped in substantially an S-shape in the vertical plane to create a lower curved portion 68 which serves as the seat for the rider or as the point of attachment for a conventional seat. The drive wheel 18 can be rotatably mounted between split ends of the frame elements 64, 66 distal to the first and second wheels.

Figure 6:
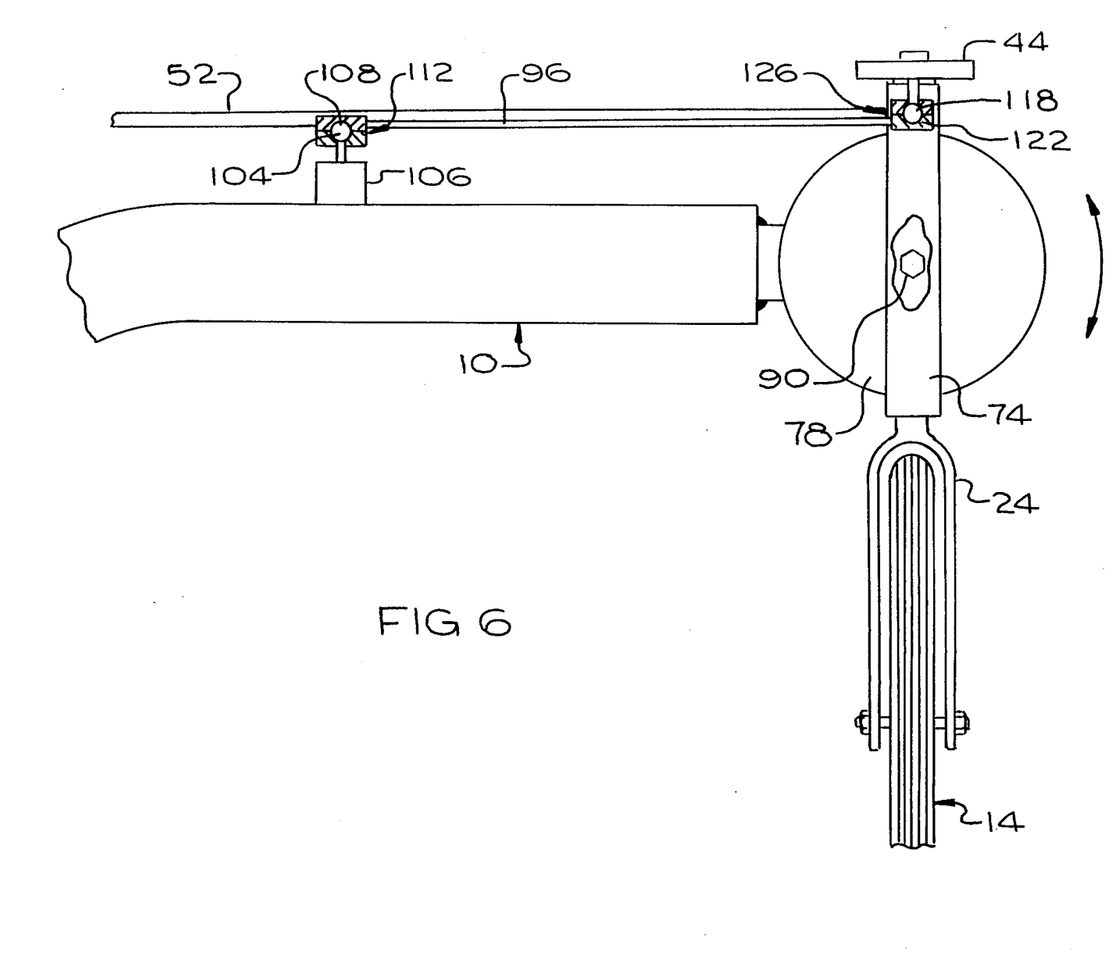
FIG. 6 is a front elevation showing wheel camber adjustment structure according to the invention.
Figure 7:
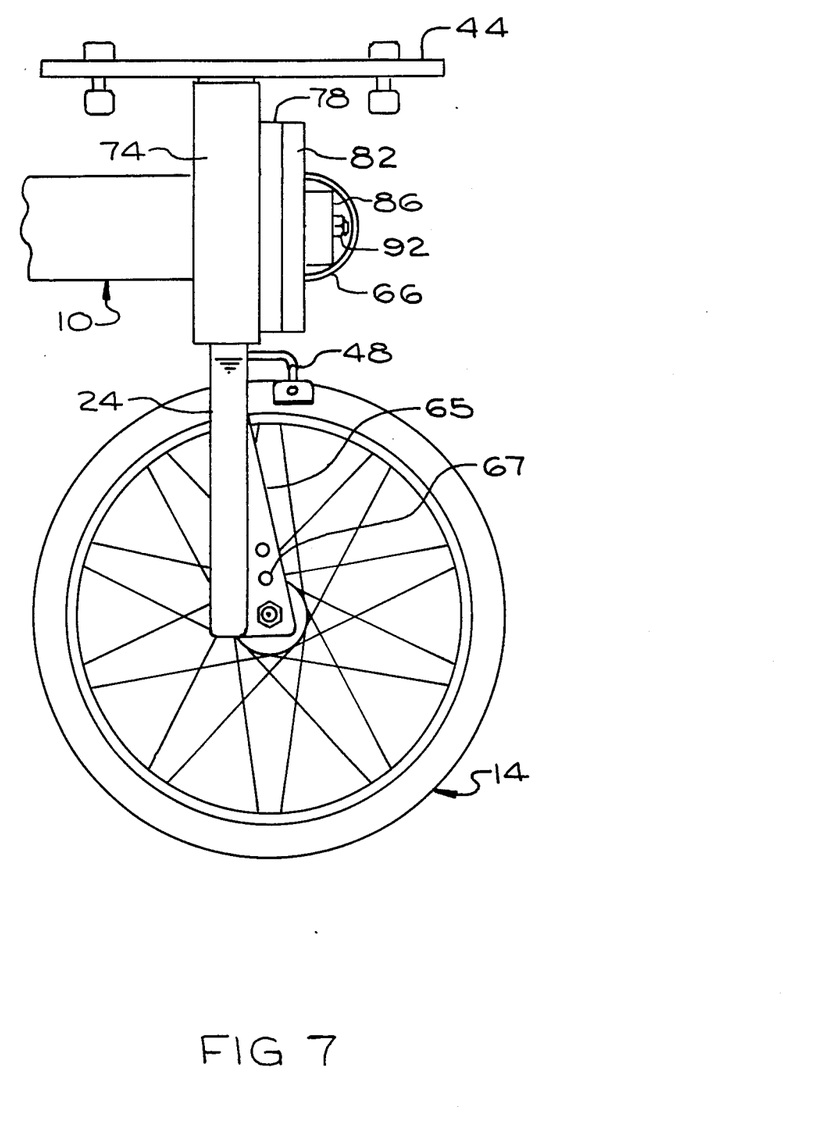
FIG. 7 is a side elevation showing wheel camber adjustment structure.
Figure 8:
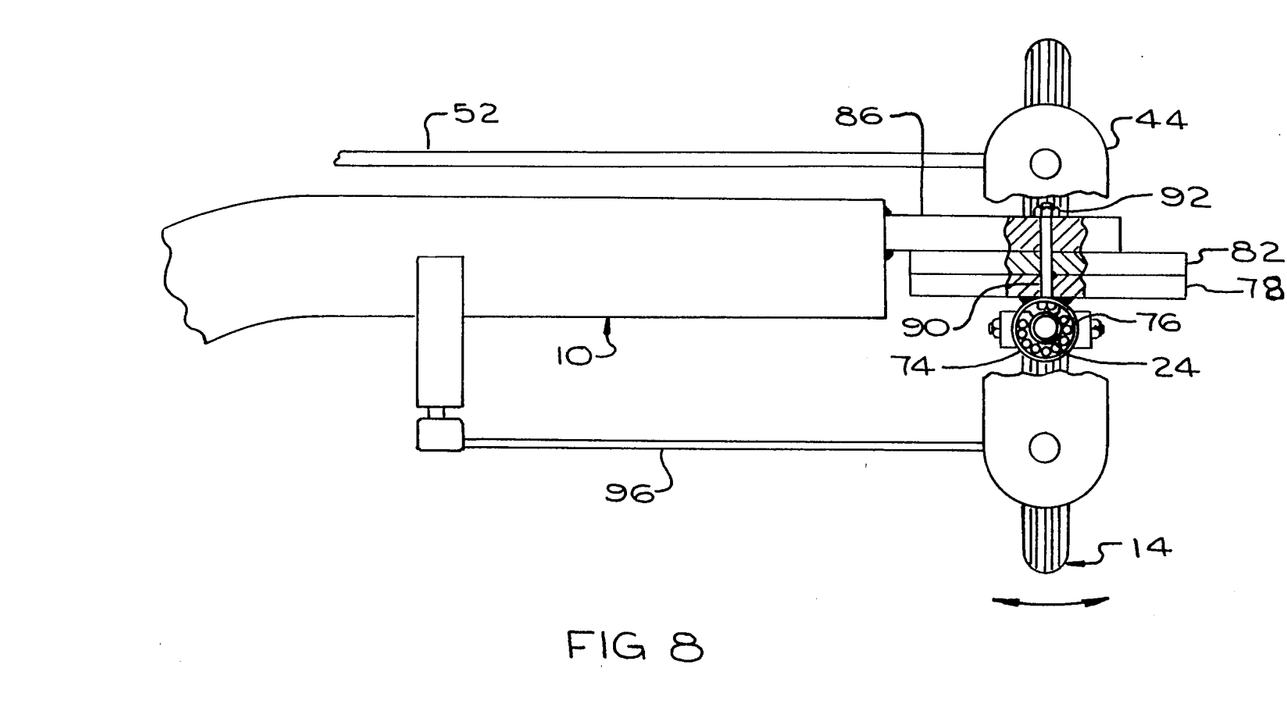
FIG. 8 is a plan view, partially broken away, of wheel camber adjustment structure.

Still another feature of the invention provides for automatic adjustment of the camber of the first and second wheels upon turning. This alternative embodiment is depicted in FIGS. 6-8 wherein like parts from the previous embodiment have like numbers. Each of the wheel mounting structure such as the forks 20, 24 are mounted so as to be pivotable about a horizontal, longitudinal axis with respect to the direction of motion of the cycle. The forks must also retain their ability to rotate about their vertical axes. This is accomplished according to the invention by pivotally mounting each vertical guide housing to the frame 10. The forks are rotatably mounted within the vertical guide housing as previously described. In the preferred embodiment the vertical guide housing 74 (FIG. 6) is fixed to a contact plate 78 which mates with an opposing contact plate 82 that is fixed to an extension 86 of the frame 10. Suitable fastening structure such as the bolt 90 and nut 92 holds the joint together while permitting relative movement between the contact plates 78 and 82.

The contact plate 78 rotates about the horizontal, longitudinal axis with the fork 24 and wheel 14. A rigid spar 96 is connected between the frame 10 and connecting plate 44. Each connection of the spar is preferably pivotal about more than one axis of rotation such as by the ball and socket joint that is shown. A ball 104 is mounted to a fitting 106 on the frame 10. The ball 104 mates with a socket 108 formed in a member 112 fixed to one end of the rod 96. The opposing end of the rod 96 is secured to the connecting plate 44 by another ball and socket joint. A ball 118 is fixed to the connecting plate 44. The ball 118 mates with a socket 122 formed in a fitting 126 that is fixed to the end of the rod 96 opposite the frame 10. Similar structure is provided for the first wheel 12.

Figure 9:
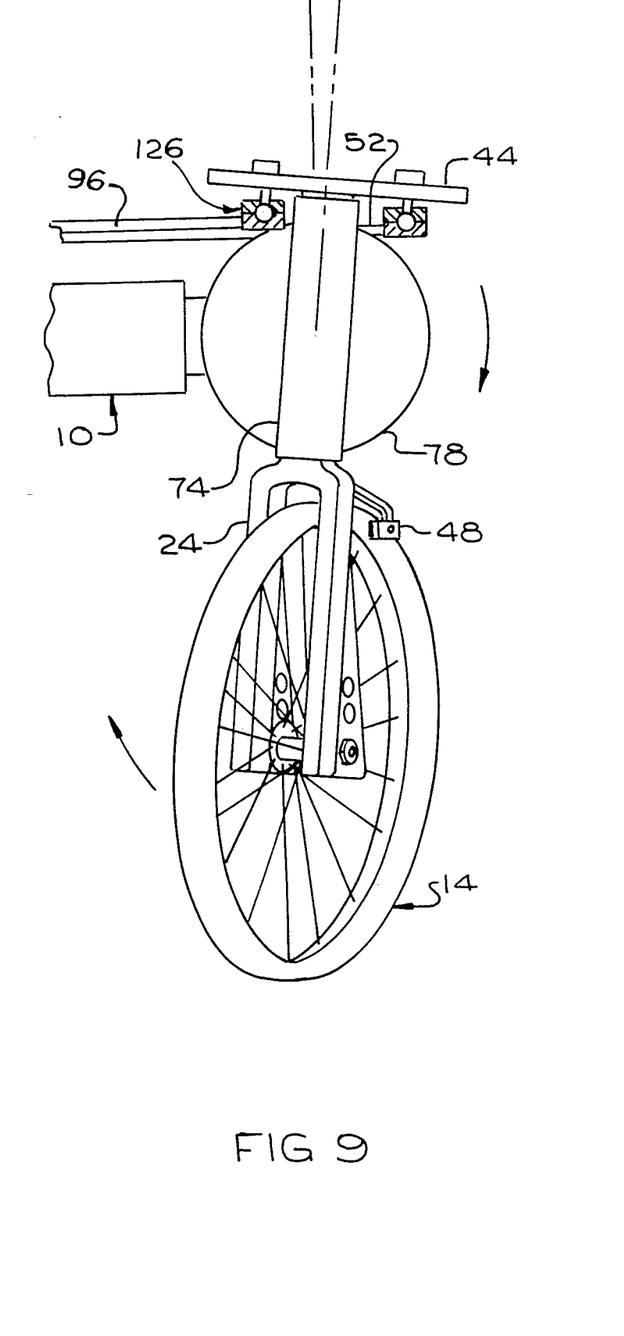
FIG. 9 is a front elevation demonstrating the operation of wheel camber adjustment structure according to the invention.

Rotation of one of the first and second wheels about the vertical axis by movement of one of the steering linkages, such as the linkage 52 on the second wheel 14, also causes rotation of the fork and wheel about the horizontal, longitudinal axis. The rigid rod member 96 restricts the rotation of the connecting plate 44 while permitting enough rotation to perform a turn. The connecting plate 44, the fork 24, the vertical guide housing 74, the contact plate 78, and the second wheel 14 pivot about the horizontal, longitudinal axis defined by the bolt 90. The wheel 14 is thereby automatically cambered into the turn to provide maximum traction through the turn. The system is also provided on the first wheel 12 to camber into a turn in the opposite direction. The camber system will also work with a variety of steering systems. The resulting cycle is extremely responsive in turns and provides traction not heretofore found in three-wheeled cycles during sharp turns.

The drive wheel 18 can be driven by a conventional pedal drive structure as is known in the art. Accordingly, foot pedals could be affixed directly to the drive wheel 18. It is preferable, however, to include a pedal, sprocket and chain assembly as shown in FIGS. 1-3. The assembly would include a sprocket 140 to which pedals 146 and 150 are fixed in a manner known in the art. A chain 154 can be connected to a sprocket 160 on the drive wheel 18 to provide power to the drive wheel 18. The pedal, sprocket and chain assembly allows for the provision of gear-changing structure 164 as is known in the art. The cyclist can select between a number of gear ratios as desired.

It would also be possible to contruct a cycle according to the invention which powers the drive wheel 18 by the provision of a motor such as an internal combustion engine or an electric motor.

A fairing can be constructed from fiberglass or other suitable materials to increase the aerodynamic efficiency and appearance of the cycle. A molded seat can be fixed to the frame 10 for the comfort of the driver.

This invention can be embodied in other forms without departing from the spirit or essential attributes thereof, and accordingly, reference should be made to the following claims, rather than to the foregoing specification, as indicating the scope of the invention.

I claim:
1. A three-wheeled cycle, comprising:
a frame;
first and second wheels, each rotatably mounted to the frame about substantially a horizontal axis and a vertical axis, said horizontal axis of rotation of said first and second wheels trailing behind the respective vertical axis of rotation, each of said first and second wheels being rotatably mounted about said horizontal axis to wheel mounting structure, the wheel mounting structure being substantially vertically mounted to the frame, and rotatable with respect to the frame about substantially a vertical axis;
a drive wheel rotatably mounted to the frame about a horizontal axis;
means for driving said drive wheel; and,
steering means for rotating at least one of said first and second wheels about their vertical axis.

2. The three-wheeled cycle of claim 1, further comprising means for adjusting the length of said trail of said horizontal axis of rotation of said first and second wheels behind said vertical axis of rotation.

3. The three-wheeled cycle of claim 2, wherein said wheel mounting structure is a fork, said first or second wheel being suspended between legs of said fork by axle structure, said means for adjusting the length of said trail comprising a plurality of sets of connecting structure on said forks for mounting said first and second wheels, each set of said connecting structure providing a horizontal axis of rotation a distance behind said vertical axis of rotation and different from other sets of connecting structure on each of said forks.

4. A three-wheeled cycle, comprising:
a frame;
first and second wheels, each rotatably mounted to the frame about substantially a horizontal axis and a vertical axis of each of said first and second wheels being rotatably mounted about substantially a horizontal axis to wheel mounting structure, said wheel mounting structure being rotatably mounted about a substantially vertical axis within a vertical guide housing;
a drive wheel rotatably mounted to the frame about a horizontal axis;
means for driving said drive wheel;
steering means for rotating at least one of said first and second wheels about their vertical axis; and,
means for adjusting the camber of said first and second wheels, said means for adjusting the camber of said first and second wheels comprising means for pivotally mounting said vertical guide housing to said frame about a horizontal, longitudinal axis.

5. The three-wheeled cycle of claim 4, wherein said wheel mounting structure is a fork, said vertical guide housing being pivotally mounted to said frame by two mating disks, one of said disks being fixed to said vertical guide housing and the other said disk being fixed to said frame.

6. The three-wheeled cycle of claim 5, wherein said means for driving comprises pedal means.

7. A three-wheeled cycle, comprising:
an elongated frame having a forward end and a rear end;
first and second wheels, each mounted to the frame substantially near said rear end of the frame and being rotatable at least about substantially a horizontal axis and a vertical axis;
a drive wheel rotatably mounted to the frame about a horizontal axis, said drive wheel being mounted substantially near the forward end of the frame;
means for driving said drive wheels; and,
steering means for rotating at least one of said first and second wheels about their vertical axis.

8. The three-wheeled cycle of claim 7, wherein each of said first and second wheels are rotatably mounted about substantially a horizontal axis to wheel mounting structure, the wheel mounting structure being substantially vertically mounted to the frame, the wheel mounting structure being rotatably mounted to the frame about a vertical axis.

9. The three wheeled-cycle of claim 8, wherein said steering means is adapted to rotate at least one of said wheel mounting structures about said vertical axis.

10. The three-wheeled cycle of claim 9, wherein said steering means comprises linkages to connecting plates fixed to and extending a radial distance from the vertical axis of rotation of the wheel mounting structure, each linkage being connected to handle means, the handle means adapted for manipulation by the driver to move at least one of the linkages and thereby to pivot at least one of the first and second wheels about the vertical axis to steer the cycle.

11. The three-wheeled cycle of claim 10, wherein said handle means comprises a handlebar pivotally mounted to the frame.

12. The three-wheeled cycle of claim 11, further comprising a rigid, pivotally mounted rod between said frame and said wheel mounting structure.

13. The three-wheeled cycle of claim 1, wherein said frame is substantially Y-shaped, said drive wheel being mounted to the base of the Y and said first and second wheels being respectively mounted to each leg of the Y.

14. The three-wheeled cycle of claim 7, further comprising means for adjusting the camber of said first and second wheels comprising means for pivotally mounting said wheels to said frame about substantially a horizontal, longitudinal axis with respect to said frame.

15. The three-wheeled cycle of claim 14, wherein said means for adjusting the camber of said first and second wheels comprises a vertical guide housing, the wheel mounting structure being rotatably mounted about a substantially vertical axis within the vertical guide housing, said vertical guide housing being rotatably mounted to said frame about said horizontal, longitudinal axis.

16. The three-wheeled cycle of claim 7, wherein said horizontal axis of rotation of said first and second wheels trails behind the respective vertical axis of rotation.

* * * * *